US008365079B2

(12) United States Patent
Kenna et al.

(10) Patent No.: US 8,365,079 B2
(45) Date of Patent: Jan. 29, 2013

(54) COLLABORATIVE DEVELOPMENT OF VISUALIZATION DASHBOARDS

(75) Inventors: Kimberly D. Kenna, Cary, NC (US); Jesse H. Kriss, Cambridge, MA (US); Matthew M. McKeon, Cambridge, MA (US); Frank J. Van Ham, Cambridge, MA (US); Fernanda B. Viegas, Boston, MA (US); Martin M. Wattenberg, Wellesley, MA (US)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 12/347,572

(22) Filed: Dec. 31, 2008

(65) Prior Publication Data
US 2010/0169794 A1  Jul. 1, 2010

(51) Int. Cl.
*G06F 3/00* (2006.01)
(52) U.S. Cl. ....................................................... 715/738
(58) Field of Classification Search .................. 715/751, 715/744, 760, 765, 738
See application file for complete search history.

(56) References Cited

U.S. PATENT DOCUMENTS

| 6,519,601 B1 | 2/2003 | Bosch | |
|---|---|---|---|
| 2006/0095858 A1 | 5/2006 | Hao et al. | |
| 2009/0157630 A1* | 6/2009 | Yuan | 707/3 |
| 2009/0217179 A1* | 8/2009 | Mons et al. | 715/760 |
| 2010/0174739 A1* | 7/2010 | Mons et al. | 707/769 |

OTHER PUBLICATIONS

"Creating Charts and Tables in Wiki Pages"; http://studios.thoughtworks.com/mingle-agile-project-management/2.0/ help/creating_charts_and_tables_in_wiki_pages.html; accessed on Dec. 28, 2008.
Andreeva, J.; Gaidioz, B.; Herrala, J.; Maier, G.; Rocha, R.; Saiz, P; "Experiment Dashboard—The Monitoring System for the LHC Experiments"; GMW; pp. 45-49; Jun. 25, 2007.
Smith, M.; Fiore, A.; "Visualization Components for Persistent Conversations"; CHI; vol. 3; Issue No. 1; pp. 136-143; Mar. 31, Apr. 5, 2001.
Marcus, A.; "Visualizing the Future of Information Visualization"; Interactions; pp. 42-43; Mar. Apr. 2006.
Pautasso, C.; Zimmermann, O.; Leymann, F.; "RESTful Web Services v. "Big" Web Services: Making the Right Architectural Decision"; WWW 2008; pp. 805-814; Apr. 21-25, 2008; China.
"Twiki Chart Plugin"; http://twiki.org/cgi-bin/view/Plugins/ChartPlugin; Accessed on Jan. 2, 2009. "Wiki Creole, Creole 1.0"; http://www.wikicreole.org/wiki/Creole1.0; Accessed on Jan. 2, 2009.
"Google Chart API"; http://code.google.com/apis/chart/basics.html; Accessed on Jan. 2, 2009.

\* cited by examiner

*Primary Examiner* — Thanh Vu
(74) *Attorney, Agent, or Firm* — Steven M. Greenberg, Esq.; Carey, Rodriguez, Greenberg & O'Keefe

(57) ABSTRACT

Embodiments of the present invention provide a method, system and computer program product for the collaborative development of a visualization dashboard. In an embodiment of the invention, a method for collaboratively developing a visualization dashboard can be provided. The method can include identifying an extended Wiki directive within a Wiki artifact for a visualization dashboard. The method further can include retrieving data referenced by the extended Wiki directive and one or more visual display elements referenced by the extended Wiki directive to visualize portions of the retrieved data. The method yet further can include mapping the visual display elements referenced by the extended Wiki directive to components requisite to programmatically rendering the visual display elements in the visualization dashboard. The method even yet further can include arranging the components in the visualization dashboard and linking the components to the retrieved data. Finally, the method can include displaying the visualization dashboard.

12 Claims, 2 Drawing Sheets

COLLABORATIVE DEVELOPMENT OF VISUALIZATION DASHBOARDS

BACKGROUND OF THE INVENTION

1. Field of the Invention

The present invention relates to the field of visualization tools and more particularly to dashboard visualization tools.

2. Description of the Related Art

As computer technology advances, computing systems have undertaken a role of aggregator, in aggregating information from multiple different sources. With sources ranging from data systems storing information in repositories to end users compiling information, oftentimes the limiting factor in analyzing aggregated information rests not with computing resources, but with the human operator. Specifically, though the computing system may aggregate vast quantities of data in near real-time, in the end a human being must visualize the compilation of data to draw effective conclusions from the visualization. Yet, the ability of the end user to digest compiled information varies inversely with the amount of data presented to the end user. Where the amount of compiled data becomes excessive, it can be nearly impossible for a human being to adequately analyze the data.

Visualization tools are used to understand collected data and correlations therein. Such visualization tools commonly use scatter plot diagrams to visualize operational data. Other tools use slice and dice tree map diagrams. While the spreadsheet application provided the initial foundation for data visualization, spreadsheets are limited in applicability and suffer from the ability to seamlessly provide a real time view to a collection of information. Accordingly, large scale collaborative systems provide embedded visualization tools to analyze internally collected data. In some cases, sophisticated collaborative systems provide end user access to a dashboard view of data visualization. In the dashboard view, a single window presents one or more diagrams representative of collected data.

The development and customization of a dashboard that incorporates rich data visualization is frequently performed by technical staff and not the end-user. In consequence, a dashboard can result that is either overly complex, fails to show appropriate data, or is otherwise difficult to use by the intended audience. Some manage this problem by introducing a lengthy user-centered design process which must be repeated for every new dashboard that is created. Many software vendors that include some form of data visualization in their products, such as information technology (IT) infrastructure management products, provide tools intended to help end users customize particular views of data. Frequently these data visualization tools are complex and user interface oriented, providing dozens of knobs and control points for arranging charts and graphs and connecting data inputs to visual outputs. These data visualization tools also tend to be single-user oriented, focused on lone customizers editing dashboard designs.

Data visualization has been extended to the notion of a Wiki page. A Wiki page is a page or collection of Web pages designed to enable anyone accessing the Wiki page to contribute or modify content, using a simplified markup language known as Wiki markup. Wikis are often used to create collaborative websites and to power community websites. In the context of a Wiki page, a dashboard can be defined using Wiki markup to fully describe every aspect of the visualization. As such, one creating a dashboard in the Wiki context must be fully versed in Wiki markup in order to generate a dashboard. Further, the dashboard defined in the Wiki page can be modified by the respective users of the Wiki only by way of manually editing the Wiki markup—a tedious task.

BRIEF SUMMARY OF THE INVENTION

Embodiments of the present invention address deficiencies of the art in respect to visualization tools and dashboard design production and provide a novel and non-obvious method, system and computer program product for the collaborative development of a visualization dashboard. In an embodiment of the invention, a method for collaboratively developing a visualization dashboard can be provided. The method can include identifying an extended Wiki directive within a Wiki artifact for a visualization dashboard. In this regard, as it is well-known, a Wiki artifact is a markup segment of a Wiki page. A Wiki page in turn is known as a collection of Web pages designed to enable end users accessing the Wiki page to contribute or modify content, using a simplified markup language. As the skilled artisan also will note, Wikis are often used to create collaborative Web sites and to power community Web sites.

As such, the method further can include retrieving data referenced by the extended Wiki directive and one or more visual display elements referenced by the extended Wiki directive to visualize portions of the retrieved data. The method yet further can include mapping the visual display elements referenced by the extended Wiki directive to components requisite to programmatically rendering the visual display elements in the visualization dashboard. The method even yet further can include arranging the components in the visualization dashboard and linking the components to the retrieved data and linking data corresponding to a portion of one of the visual display elements in the visualization dashboard to a different one of the visual display elements as a source of data for the different one of the visual display elements in the visualization dashboard. Finally, the method can include displaying the visualization dashboard. Optionally, an edit control can be inserted in the visualization dashboard and configured to retrieve the Wiki artifact for collaborative editing responsive to a selection of the edit control in the visualization dashboard.

In one aspect of the embodiment, the data and the visual display elements referenced by the extended Wiki directive can include be retrieved from other Wiki pages. In another aspect of the embodiment, mapping the visual display elements referenced by the extended Wiki directive to components requisite to programmatically rendering the visual display elements in the visualization dashboard further can include determining a selected one of the components corresponding to one of the visual display elements referenced by the extended Wiki directive to be inaccessible, fuzzily matching the one of the visual display elements referenced by the extended Wiki directive to a component type, invoking a What-You-See-Is-What-You-Get (WYSIWYG) editor to define an instance of a component of the fuzzily matched component type, and mapping the defined instance of the component of the fuzzily matched component type to the one of the visual display elements referenced by the extended Wiki directive in lieu of the selected one of the components determined to be inaccessible.

In another embodiment of the invention, a dashboard visualization data processing system can be configured for collaborative definition of a visualization dashboard. The system can include a Wiki engine executing in a host computing platform and an extended Wiki directive processing module coupled to the Wiki engine. The module can include program code enabled to identify an extended Wiki directive within a Wiki artifact managed by the Wiki engine for a visualization dashboard, to retrieve data referenced by the extended Wiki directive and a plurality of visual display elements referenced by the extended Wiki directive to visualize portions of the retrieved data, to map the visual display elements referenced by the extended Wiki directive to components requisite to programmatically rendering the visual display elements in the visualization dashboard.

The program code also can be enabled to arrange the components in the visualization dashboard and link the components to the retrieved data, to link data corresponding to a portion of one of the visual display elements in the visualization dashboard to a different one of the visual display elements as a source of data for the different one of the visual display elements in the visualization dashboard, and to return the visualization dashboard to the Wiki engine for display. A WYSIWYG editor further can be coupled to the extended Wiki directive processing module, the program code of the extended Wiki directive processing module further being enabled to invoke the WYSIWYG editor to interactively define selected ones of the components determined to be inaccessible and to insert a reference to the interactively defined selected ones of the components in the extended Wiki directive within the Wiki artifact.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for the collaborative development of a visualization dashboard. In accordance with an embodiment of the present invention, a Wiki directive can be parsed to identify a data source in a Wiki page for an application, and one or more visual display elements configured to visualize data from the data source. The visual display elements can be arranged according to the directive within a separate Wiki page. Thereafter, the separate Wiki page can be rendered as a dashboard view in connection with the application for the data from the data source.

Figure 1:
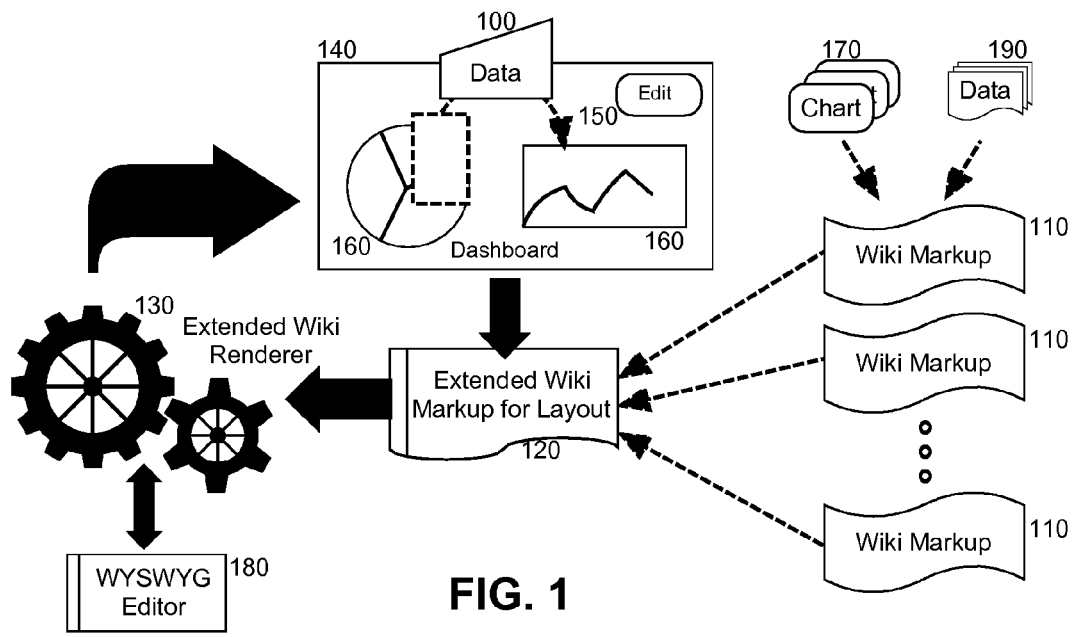
FIG. 1 is a pictorial illustration of a process for collaboratively developing a visualization dashboard.

In illustration, FIG. 1 pictorially depicts a process for collaboratively developing a visualization dashboard. As shown in FIG. 1, different portions of Wiki markup 110 can be aggregated in a Wiki markup artifact 120 specified according to an extended Wiki directive 170. In this regard, the extended Wiki directive 170 can specify one or more of the portions of Wiki markup 110 including both visual display elements 160, a data source for data 190 to be visualized by the visual display elements 160, and an arrangement of the visual display elements 160 in a dashboard visualization 140 of the data 190.

The Wiki markup artifact 120 can be provided to an extended Wiki renderer 130. The extended Wiki renderer 130 can process the extended Wiki directive 170 to arrange the visual display elements 160 in the dashboard visualization 140 in order to visualize the data 190 in the visual display elements 160. Selected ones of the visual display elements 160 further can be configured to respond to one or more user interface events, such as a selection event of a portion of a selected one of the visual display elements 160 in order to trigger a display of portions of the data 190 in another of the visual display elements 160. Optionally, an edit control 150 also can be arranged within the dashboard visualization 140 responsive to the activation of which the extended Wiki markup artifact 120 can be presented for editing by end users.

To the extent that a one or more of the visual display elements 160 for a visualization referenced by the extended Wiki directive 170 cannot be found at the time of rendering the dashboard visualization 140, a placeholder icon can be inserted in place of the visualization in the dashboard visualization 140. The placeholder icon can be activated to launch a WYSIWYG editor 180 to create the visualization. Thereafter, the visualization once created can be incorporated into the extended Wiki markup artifact 120 by referencing the newly specified and arranged ones of the visual display elements 160. In this way, a combination of Wiki-style editing of the manual Wiki markup and interactive editing with the WYSIWIG editor 180 can be supported in creating a visualization rather than relying strictly upon manual Wiki editing.

Of note, a portion of one of the visual display element 160 corresponding to a portion 100 of the data 190 can be activated to provide the portion 100 of the data 190 as a source of data for another of the visual display elements 160. In this regard, the data 100 corresponding to a portion of one of the visual display elements 160 in the dashboard visualization 140 can be lined to a different one of the visual display elements 160 as a source of data for the different one of the visual display elements 160 in the dashboard visualization 140. Thus, as different portions of one of the visual display elements 160 is selected, the corresponding underlying data 100 can be provided as a source of data for the other of the visual display elements 160.

Figure 2:
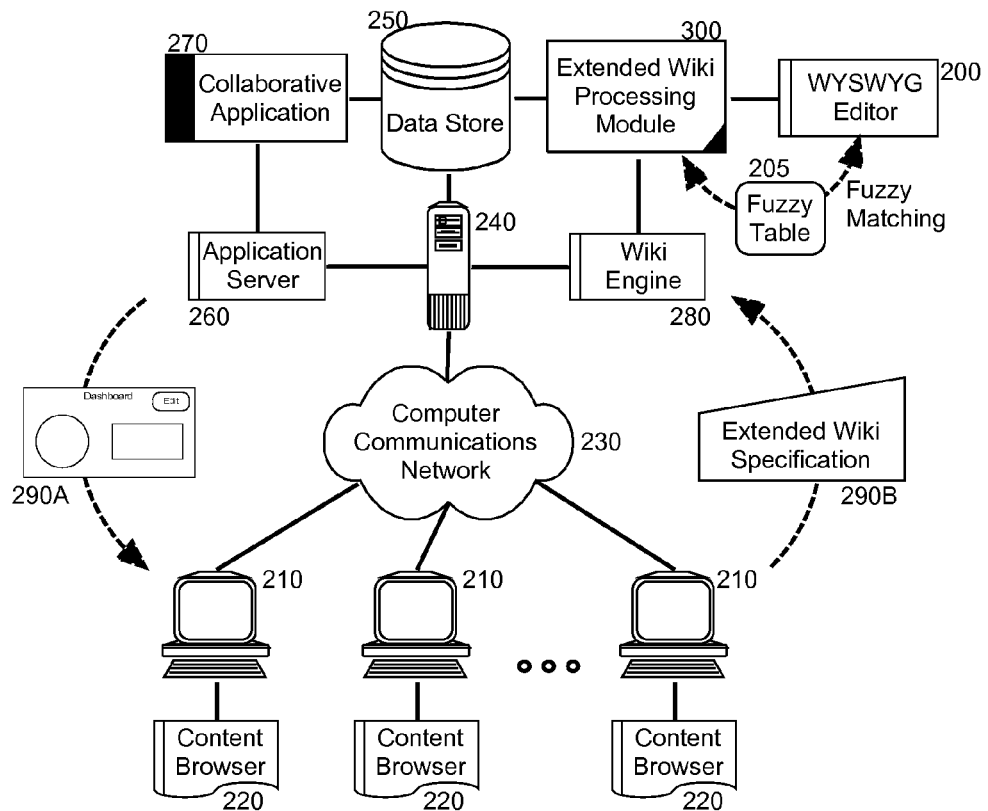
FIG. 2 is a schematic illustration of a dashboard visualization data processing system configured for collaborative definition of a visualization dashboard; and, FIG. 3 is a flow chart illustrating a process for collaboratively developing a visualization dashboard.

The process described in connection with FIG. 1 can be embodied within a dashboard visualization data processing system. In further illustration, FIG. 2 is a schematic illustration of a dashboard visualization data processing system configured for collaborative definition of a visualization dashboard. The system can include a host computing platform 240 configured for communicative coupling to different clients 210 over computer communications network 230. The host computing platform 240 can host the execution of an application server 250 providing an operating environment for an application 270, such as a collaborative computing application. Additionally, a data store 250 can be coupled to the host computing platform 240 so as to provide data storage for data produced by the application 270. In this regard, each of the clients 210 can support the execution of a content browser 220 through which access to the application 270 and corresponding data in the data store 250 can be provided.

A Wiki engine 280 can be coupled to the host computing platform 240 and can manage the creation and maintenance of Wiki pages viewable and editable by end users through respective ones of the content browsers 220. Notably, extended Wiki processing module 300 can be coupled to the Wiki engine 280. The extended Wiki processing module 300 can include program code enabled to process extended Wiki directives in an extended Wiki specification 290B, the extended Wiki directives defining a dashboard visualization 290A for data in the data store 250 for viewing on demand through the content browsers 220.

Specifically, the program code of the extended Wiki processing module 300 can be enabled to identify an extended Wiki directive in a Wiki processed by the Wiki engine 280. The program code can be enabled, in response to identifying the extended Wiki directive, to locate a specified data source in the extended Wiki directive for data in the data store 250, and also one or more visual display elements to be arranged in the visualization dashboard 290A. For example, the extended Wiki directive can include a Wiki directive in the form:

| = [Display Element 1 Title] | =[Display Element 2 Title] |
| ((DataSource:Display Element 1)) | =((DataSource.-selected:Display Element 2)) |

In the exemplary directive shown above, a data source for data to be visualized can be specified along with a display element to visualize the data from the data source. Yet further, a second display element is specified to visualize a selected portion of the data in the first display element. It will be recognized by the skilled artisan that a Wiki artifact including the extended Wiki directive also can include conventional Wiki directives specifying a precise visual arrangement of the different visual display elements.

The program code of the extended Wiki processing module 300 can be yet further enabled to locate requisite component for execution in the application server 250 for each specified visual display element configured to provide the visual display, for instance a pie chart, bar chart, line graph, tree map and the like. The requisite component can include traditional Java, Javascript and hypertext markup language (HTLM), Flash, etc., programmed to provide the desired visual display element. To the extent that the requisite component cannot be located at the time of rendering the Wiki artifact, WYSIWYG editor 200 can be invoked to provide an interactive specification and arrangement the requisite component.

Alternatively, to the extent requisite component cannot be accessed by the application server 250 that precisely maps to the specified visual display element, a fuzzy matching process by reference to a table 205 can be employed to provide a best guess (fuzzily match) to a type of visual display element consistent with a textual specification of the visual display element. For example, a textual reference to a visual display element including the term "pie" can fuzzily resolve to a pie chart type of a visual display element. Thereafter, a link can be provided in the visualization dashboard 290A and configured to activate the WYSIWYG editor 200 to provide interactive specification and arrangement of a component consistent with the fuzzily resolved type of visual display element in lieu of the requisite component determined to be inaccessible.

Even yet further, the program code of the extended Wiki processing module 300 can be enabled to insert supporting directives to respond to selection events in a given one of the visual display elements. In particular, the supporting directives can be configured to identify corresponding data for a selected portion of the given one of the visual display elements and to pass the corresponding data to another of the visual display elements for use in visualizing the corresponding data for the selected portion of the given one of the visual display elements. In this way, end users accessing extended Wiki directives in an extended Wiki specification 290B need only specify the data source, one or more visualization elements, desired relationships between the visualization elements and an arrangement of the visualization elements in order to efficiently and simplistically define the visualization dashboard 290A. Further, in that the extended Wiki specification 290B inherently is Wiki driven, the collaborative advantage of the Wiki environment can be leveraged to support the community definition of the visualization dashboard 290A.

Figure 3:
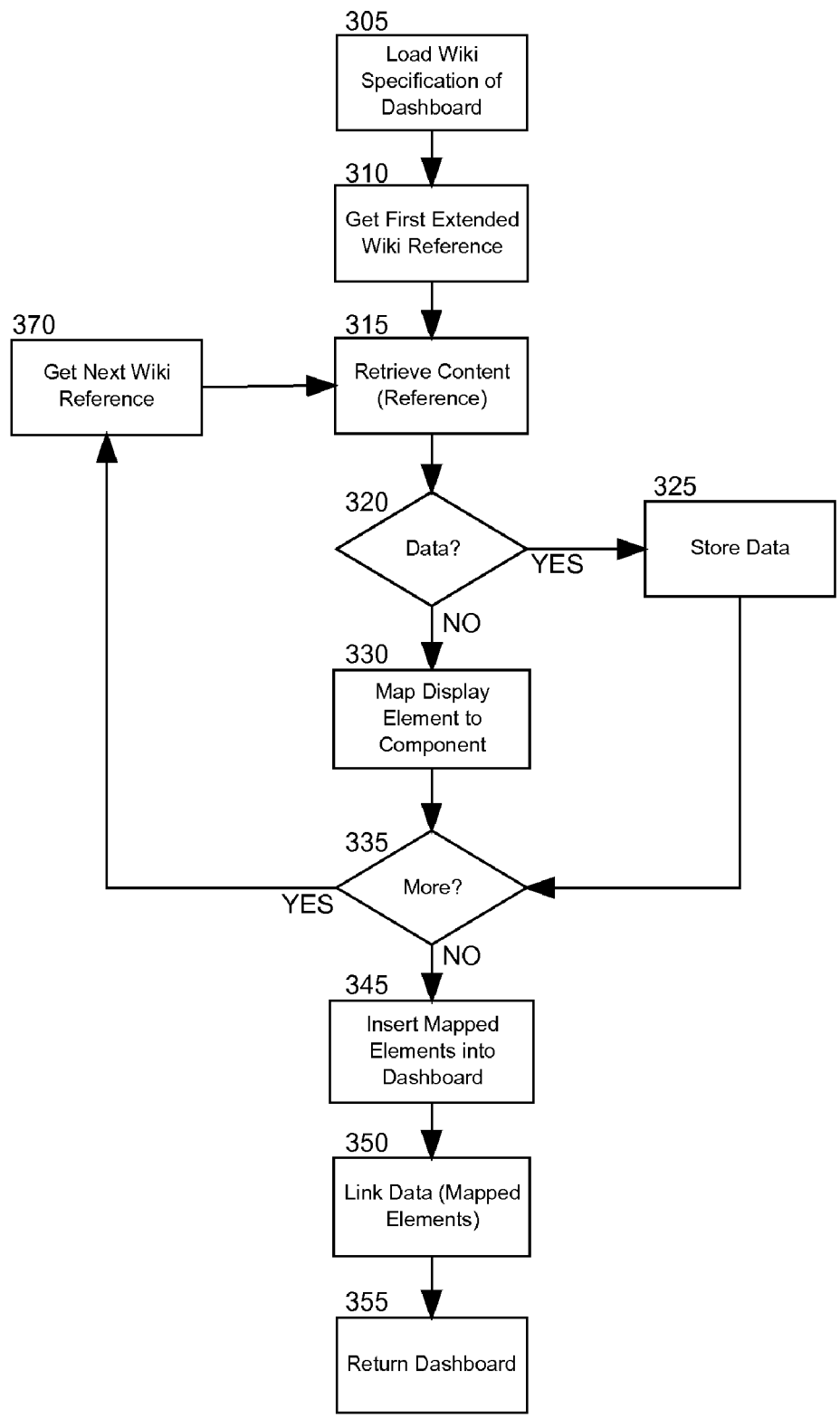

In even yet further illustration of the operation of the extended Wiki processing module 300, FIG. 3 is a flow chart illustrating a process for collaboratively developing a visualization dashboard. Beginning in block 305 a Wiki specification of a visualization dashboard can be loaded for processing. In block 310, a first extended Wiki reference to in the Wiki specification can be retrieved and corresponding content referenced by the extended Wiki reference can be retrieved in block 315. The corresponding content can be a visual display element or data to be visualized by a display element. In decision block 320, if the retrieved content is data to be visualized, in block 325 the data can be stored in memory. Otherwise, in block 330 a display element to visualize the data can be mapped to a requisite component to provide the display element.

In decision block 335, if additionally extended Wiki references remain to be processed in the Wiki specification of the visualization dashboard, in block 340 a next extended Wiki reference can be retrieved in block 315 and the process can repeat. In decision block 335, when no further extended Wiki references remain to be processed, in block 345 the mapped visual display elements can be inserted into a visualization dashboard according to additional conventional Wiki directives specifying a particular visual arrangement of the display elements. Further, the stored data can be linked to specified ones of the inserted display elements in block 350. Finally, in block 355 the visualization dashboard can be rendered for display by requesting end users.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for collaboratively developing a visualization dashboard, the method comprising:
    identifying an extended Wiki directive within a Wiki artifact for a visualization dashboard;
    retrieving data referenced by the extended Wiki directive and a plurality of visual display elements referenced by the extended Wiki directive to visualize portions of the retrieved data;
    mapping the visual display elements referenced by the extended Wiki directive to components requisite to programmatically rendering the visual display elements in the visualization dashboard;
    arranging the components in the visualization dashboard and linking the components to the retrieved data;
    linking data corresponding to a portion of one of the visual display elements in the visualization dashboard to a different one of the visual display elements as a source of data for the different one of the visual display elements in the visualization dashboard; and,
    displaying the visualization dashboard.

2. The method of claim 1, further comprising:
    inserting an edit control in the visualization dashboard; and,
    configuring the edit control to retrieve the Wiki artifact for collaborative editing responsive to a selection of the edit control in the visualization dashboard.

3. The method of claim 1, wherein retrieving data referenced by the extended Wiki directive and a plurality of visual display elements referenced by the extended Wiki directive to visualize portions of the retrieved data, comprises retrieving from other Wiki pages data referenced by the extended Wiki directive and a plurality of visual display elements referenced by the extended Wiki directive to visualize portions of the retrieved data.

4. The method of claim 1, wherein mapping the visual display elements referenced by the extended Wiki directive to components requisite to programmatically rendering the visual display elements in the visualization dashboard, further comprises:
    determining a selected one of the components corresponding to one of the visual display elements referenced by the extended Wiki directive to be inaccessible;
    fuzzily matching the one of the visual display elements referenced by the extended Wiki directive to a component type;
    invoking a What-You-See-Is-What-You-Get (WYSIWYG) editor to define an instance of a component of the fuzzily matched component type; and,
    mapping the defined instance of the component of the fuzzily matched component type to the one of the visual display elements referenced by the extended Wiki directive in lieu of the selected one of the components determined to be inaccessible.

5. A dashboard visualization data processing system configured for collaborative definition of a visualization dashboard, the system comprising:
    a Wiki engine executing in a host computing platform;
    an extended Wiki directive processing module coupled to the Wiki engine, the module comprising program code enabled to identify an extended Wiki directive within a Wiki artifact managed by the Wiki engine for a visualization dashboard, to retrieve data referenced by the extended Wiki directive and a plurality of visual display elements referenced by the extended Wiki directive to visualize portions of the retrieved data, and to map the visual display elements referenced by the extended Wiki directive to components requisite to programmatically rendering the visual display elements in the visualization dashboard, to arrange the components in the visualization dashboard and link the components to the retrieved data, to link data corresponding to a portion of one of the visual display elements in the visualization dashboard to a different one of the visual display elements as a source of data for the different one of the visual display elements in the visualization dashboard, and to return the visualization dashboard to the Wiki engine for display.

6. The system of claim 5, wherein the visual display elements comprise elements selected from the group consisting of a pie chart, a bar chart, a tree map and a line graph.

7. The system of claim 5, further comprising an edit control disposed in the visualization dashboard, the edit control comprising a configuration to retrieve the Wiki artifact for collaborative editing responsive to a selection of the edit control in the visualization dashboard.

8. The system of claim 5, further comprising a what-you-see-is-what-you-get (WYSIWYG) editor coupled to the extended Wiki directive processing module, the program code of the extended Wiki directive processing module further being enabled to invoke the WYSIWYG editor to interactively define selected ones of the components determined to be inaccessible and to insert a reference to the interactively defined selected ones of the components in the extended Wiki directive within the Wiki artifact.

9. A computer program product comprising a computer usable storage medium storing computer usable program code for collaboratively developing a visualization dashboard, the computer program product comprising:
    computer usable program code for identifying an extended Wiki directive within a Wiki artifact for a visualization dashboard;
    computer usable program code for retrieving data referenced by the extended Wiki directive and a plurality of visual display elements referenced by the extended Wiki directive to visualize portions of the retrieved data;
    computer usable program code for mapping the visual display elements referenced by the extended Wiki directive to components requisite to programmatically rendering the visual display elements in the visualization dashboard;

computer usable program code for arranging the components in the visualization dashboard and linking the components to the retrieved data;

computer usable program code for linking data corresponding to a portion of one of the visual display elements in the visualization dashboard to a different one of the visual display elements as a source of data for the different one of the visual display elements in the visualization dashboard; and, computer usable program code for displaying the visualization dashboard.

10. The computer program product of claim 9, further comprising:

computer usable program code for inserting an edit control in the visualization dashboard; and, computer usable program code for configuring the edit control to retrieve the Wiki artifact for collaborative editing responsive to a selection of the edit control in the visualization dashboard.

11. The computer program product of claim 9, wherein the computer usable program code for retrieving data referenced by the extended Wiki directive and a plurality of visual display elements referenced by the extended Wiki directive to visualize portions of the retrieved data, comprises computer usable program code for retrieving from other Wiki pages data referenced by the extended Wiki directive and a plurality of visual display elements referenced by the extended Wiki directive to visualize portions of the retrieved data.

12. The computer program product of claim 9, wherein the computer usable program code for mapping the visual display elements referenced by the extended Wiki directive to components requisite to programmatically rendering the visual display elements in the visualization dashboard, further comprises:

computer usable program code for determining a selected one of the components corresponding to one of the visual display elements referenced by the extended Wiki directive to be inaccessible;

computer usable program code for fuzzily matching the one of the visual display elements referenced by the extended Wiki directive to a component type;

computer usable program code for invoking a what-you-see-is-what-you-get (WYSIWYG) editor to define an instance of a component of the fuzzily matched component type; and, computer usable program code for mapping the defined instance of the component of the fuzzily matched component type to the one of the visual display elements referenced by the extended Wiki directive in lieu of the selected one of the components determined to be inaccessible.

* * * * *